(12) United States Patent
Sayilgan et al.

(10) Patent No.: US 8,939,404 B2
(45) Date of Patent: Jan. 27, 2015

(54) PRESSURE FUSELAGE OF AN AIRCRAFT WITH DOME-SHAPED PRESSURE BULKHEAD

(75) Inventors: Cihangir Sayilgan, Hamburg (DE); Martin Beckmann, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/440,133

(22) Filed: Apr. 5, 2012

(65) Prior Publication Data

US 2012/0228427 A1  Sep. 13, 2012

Related U.S. Application Data

(63) Continuation of application No. PCT/EP2010/065037, filed on Oct. 7, 2010.

(60) Provisional application No. 61/250,323, filed on Oct. 9, 2009.

(30) Foreign Application Priority Data

Oct. 9, 2009 (DE) .......................... 10 2009 049 007

(51) Int. Cl.
  *B64C 1/10* (2006.01)
  *B64C 1/06* (2006.01)
(52) U.S. Cl.
  CPC . *B64C 1/10* (2013.01); *B64C 1/061* (2013.01); *B64C 1/068* (2013.01)
  USPC .......................................... 244/119; 244/121
(58) Field of Classification Search
  USPC .................................................. 244/119, 121
  See application file for complete search history.

(56) References Cited

U.S. PATENT DOCUMENTS

| | | | | |
|---|---|---|---|---|
| 5,893,534 A | * | 4/1999 | Watanabe | 244/119 |
| 5,934,616 A | * | 8/1999 | Reimers et al. | 244/119 |
| 6,010,286 A | * | 1/2000 | Cross et al. | 410/129 |
| 6,213,426 B1 | * | 4/2001 | Weber et al. | 244/117 R |
| 6,276,866 B1 | * | 8/2001 | Rutan | 403/375 |
| 6,378,805 B1 | * | 4/2002 | Stephan et al. | 244/119 |
| 6,443,392 B2 | * | 9/2002 | Weber et al. | 244/117 R |

(Continued)

FOREIGN PATENT DOCUMENTS

| | | |
|---|---|---|
| CN | 1405062 A | 3/2003 |
| CN | 101056796 A | 10/2007 |

(Continued)

*Primary Examiner* — Philip J Bonzell
*Assistant Examiner* — Michael Kreiner
(74) *Attorney, Agent, or Firm* — Lerner, David, Littenberg, Krumholz & Mentlik, LLP

(57) ABSTRACT

A pressure fuselage of an aircraft, which fuselage in longitudinal direction comprises several fuselage sections, wherein at least one rear dome-shaped pressure bulkhead is provided to form an aircraft-internal pressurized region, with a ring-shaped frame element profile being provided for radially outward attachment of said dome-shaped pressure bulkhead to at least one fuselage section, wherein the frame element profile on the side of the dome-shaped pressure bulkhead comprises a U-shaped profile section whose first end-side limb is attached towards the back on the dome-shaped pressure bulkhead by way of connecting means, and whose elongated radially outward extending second limb establishes a connection to the at least one fuselage section in such a manner that it is possible for the connecting means to be installed solely from the aircraft-internal pressurized region.

11 Claims, 2 Drawing Sheets

(56) References Cited

U.S. PATENT DOCUMENTS

| | | |
|---|---|---|
| 7,766,277 B2 | 8/2010 | Anderson et al. |
| 7,874,516 B2 | 1/2011 | Cacciaguerra |
| 8,047,465 B2 * | 11/2011 | Payen .................. 244/17.11 |
| 8,366,043 B2 * | 2/2013 | Stephan .................. 244/119 |
| 8,702,038 B2 * | 4/2014 | Bauer et al. .................. 244/120 |
| 2008/0149769 A1 | 6/2008 | Koch et al. |
| 2008/0179459 A1 * | 7/2008 | Garcia Laja et al. ......... 244/119 |
| 2008/0296433 A1 * | 12/2008 | Brenner et al. ............. 244/129.1 |
| 2010/0243806 A1 * | 9/2010 | Vera Villares et al. ........ 244/119 |
| 2011/0101163 A1 | 5/2011 | Haack |
| 2011/0179626 A1 * | 7/2011 | Weber et al. .................. 29/428 |
| 2011/0233334 A1 | 9/2011 | Stephan |

FOREIGN PATENT DOCUMENTS

| | | |
|---|---|---|
| CN | 101360648 A | 2/2009 |
| DE | 3844080 A1 | 7/1990 |
| DE | 102006027707 A1 | 12/2007 |
| DE | 102007052140 A1 | 5/2009 |
| RU | 2274584 C2 | 4/2006 |
| WO | 03047973 A1 | 6/2003 |
| WO | WO2009056643 * | 5/2009 |
| WO | 2010112644 A1 | 10/2010 |

* cited by examiner

PRESSURE FUSELAGE OF AN AIRCRAFT WITH DOME-SHAPED PRESSURE BULKHEAD

CROSS-REFERENCE TO RELATED APPLICATIONS

The present application is a continuation of International Application No. PCT/EP2010/065037, filed Oct. 7, 2010, which claims the benefit of U.S. Provisional Patent Application No. 61/250,323, filed Oct. 9, 2009 and of German Patent Application No. 10 2009 049 007.8, filed Oct. 9, 2009, the entire disclosures of which are hereby incorporated herein by reference.

TECHNICAL FIELD

The present invention relates to a pressure fuselage of an aircraft, which fuselage in longitudinal direction comprises several fuselage sections, wherein at least one rear dome-shaped pressure bulkhead is provided to form an aircraft-internal pressurized region, with a ring-shaped frame element profile being provided for radially outward attachment of said dome-shaped pressure bulkhead to at least one fuselage section.

The field of application of the present invention predominantly relates to commercial aircraft engineering. For transporting passengers or cargo, usually commercial aircraft with a large-body fuselage are used, which fuselage can be divided into several levels. Thus apart from wound fuselage constructs there are also fuselage constructs incorporating the so-called shell division concept. The fuselages of the latter aircraft form the load-bearing structure. In fuselage shells, longitudinally-acting forces and torsional forces acting perpendicularly to the longitudinal direction are, among other things, introduced by the wings, the engines and the tail unit. The very considerable mechanical stiffness of the outer shell in the face of the forces acting against it results from the essentially tubular elongated design of the fuselage. Within the shell structure, longitudinally extending stringers in combination with circumferentially extending ring-shaped frame elements provide the required stability of the fuselage. The stringers and frame elements prevent dents and the like from forming in the outer shell, which dents could impede the mechanical load bearing capacity of the outer shell in the face of longitudinal forces, transverse forces and torsional forces.

The transport of cargo, and in particular of persons, at high flight altitudes requires the atmospheric pressure within the fuselage to be approximately maintained. To this effect the fuselage comprises an aircraft-internal pressurized region that is pressurized at atmospheric pressure. As a rule, apart from a passenger cabin, the cargo hold of an aircraft is also kept at atmospheric pressure. Outside the aircraft-internal pressurized region predominantly equipment sets and the like are arranged. In the context of the present invention a fuselage of this type is referred to as a "pressure fuselage".

A pressure fuselage can comprise several fuselage sections that are used as an alternative to, or apart from, shell division, in particular in the construction of very long fuselages. The present invention can be applied to fuselages according to the shell division concept with concurrent or alternative section division.

From DE 10 2006 027 707 A1 a pressure fuselage of a generic aircraft is known. In the rear region of the pressure fuselage the aircraft-internal pressurized region, the cabin, makes a transition to a non-pressurized region in the rear. In this region the load-bearing outer shell is supported by interior longitudinally-extending stringers and frame elements that are arranged transversely to the aforesaid. The frame elements comprise a shape that corresponds to the cross section of the outer shell, which is essentially ring-shaped. The supporting structure, which is formed by the stringers and the frame elements, itself does not provide any, or only little, mechanical load bearing ability. In this fuselage section the load bearing capacity only acts in conjunction with the outer shell. Because of the pressure differential between the pressure fuselage and the non-pressurized rear region, forces act in longitudinal direction on a pressure partition that forms the border. To provide the pressure partition with adequate mechanical stability in the face of these forces there are various struts. In addition, a dome-shaped pressure bulkhead, which is curved outward in the direction of the non-pressurized rear region, is integrated in the pressure partition. The connection between the radially outward edge region of the curved dome-shaped pressure bulkhead and the adjoining frame element needs to be pressure-tight and stable in view of the loads experienced. This solution of the state of the art appears associated with a disadvantage in that it requires quite an elaborate connection with various struts and the resulting considerable installation expenditure.

DE 10 2007 052 140 A1 discloses another technical solution for the attachment of a dome-shaped pressure bulkhead within a pressure fuselage of an aircraft. The fuselage structure comprises a ring-shaped main segment that comprises a cross-sectional opening that is closed by way of a dome-shaped pressure bulkhead. Several tension struts connect the dome-shaped pressure bulkhead to the ring-shaped main segment, and in this process absorb the loads acting on the dome-shaped pressure bulkhead as tensile loads. With these technical solutions it is possible to avoid the use of reinforcement elements that are subjected to bending loads. Consequently the tension struts can also be constructed with a smaller cross section, which in turn results in weight savings.

However, pressure-tight connection of the dome-shaped pressure bulkhead to the adjacent fuselage section requires further components, in particular curved ring frame elements with special bending radii, which are to be attached in a stable manner to the fuselage section by way of support angles. The overall quite numerous connection elements and support elements are therefore very elaborate to install. In particular when riveting the dome-shaped pressure bulkhead to the associated support elements, rivets need to be placed that require access to the dome-shaped pressure bulkhead from both sides. This is because the rivet needs to be struck from one side and needs to be counter-held on the opposite side. Due to the geometric shape it is not possible in practical applications to squeeze rivets. Furthermore, access on the side of the rear region is very unfavorable due to the lack of accessible height. For this reason the dome-shaped pressure bulkhead is usually installed in the aircraft in quite an early installation step. Any fitting of systems in advance is therefore at best only possible to a limited extent. Moreover, during the drilling of rivet holes, on both sides of the dome-shaped pressure bulkhead bore chips arise that are quite expensive to remove.

BACKGROUND TO THE INVENTION

It is thus the object of the present invention to create a pressure fuselage of an aircraft, whose dome-shaped pressure bulkhead can be installed in a simple manner with few connection elements and support elements.

This object is met starting with a pressure fuselage described herein.

The invention includes the technical teaching according to which the special frame element profile provided for attachment of the dome-shaped pressure bulkhead comprises a U-shaped profile section, on the side of the dome-shaped pressure bulkhead, with the first end-side limb of said profile section being attached towards the back on the dome-shaped pressure bulkhead by way of connecting means, and with the elongated radially-outward extending second limb of said profile section establishing a connection to the at least one fuselage section in such a manner that it is possible for the connecting means to be installed solely from the aircraft-internal pressurized region.

The solution according to the invention provides an advantage, in particular, in that because of the functionally integrated special frame element profile fewer individual component elements are needed to undertake dome-shaped pressure bulkhead attachment. Thus the number of individual connection positions is correspondingly reduced. Overall, the solution according to the invention results in reduced work effort. In particular the now only one-sided access required, namely from the aircraft-internal pressurized region, obviates the need for installing personnel to be available on both sides of the dome-shaped pressure bulkhead in order to produce the connection positions, which are preferably in the form of riveted positions, between the frame element profile and the dome-shaped pressure bulkhead. Because of this one-sided installation position it is now possible to squeeze the rivet instead of only shooting it. Furthermore, the solution according to the invention provides the prerequisites for carrying out subsequent installation during the production process of the aircraft, thus making it possible to fit systems in advance to the pressure partition.

In other words, the dome-shaped pressure bulkhead is thus attached directly to the functionally-integrated frame element profile according to the invention. Accordingly, there is no longer any need to provide an additional transition piece with associated connecting means.

According to a measure improving the invention, several tension struts are provided which are arranged so as to be spaced apart from each other along the circumference of the dome-shaped pressure bulkhead, which tension struts by one end are attached to the rim of the dome-shaped pressure bulkhead by way of the connecting means, and by the other end are attached to the adjacent fuselage section on the side of the pressurized region. According to their technical function, the tension struts are only subjected to tensile loads, thus preventing any bending of the frame element profile according to the invention as a result of the pressure differential between the aircraft-internal pressurized region and the outer region, which is subjected to less pressure in flight. In this way the required static stability of the construction in the critical radially outward region of the dome-shaped pressure bulkhead is ensured.

Preferably, each tension strut is designed as a metal strip of adequate tensile strength that on both end regions comprises openings for receiving connecting means, preferably rivets. Consequently, the support function caused by the tensile strut can be implemented by a relatively light-weight design.

According to a further measure improving the invention, the elongated radially-outward-extending second limb of the frame element profile leads to a T-shaped profile section by way of whose cross piece attachment to the at least one fuselage section takes place. For this purpose, too, rivets are suitable that are to be affixed on both sides of the elongated limb on both ends of the cross piece. Thus no further profile components or similar auxiliary construction elements are necessary in order to attach the frame element profile according to the invention to the associated fuselage section.

Advantageously two adjacent fuselage sections can be interconnected by means of the cross section of the T-shaped profile section. To this extent it is possible to do without a gap-bridging frame element that would otherwise be required.

The solution according to the invention can be implemented with regard to various fuselage construction concepts. Thus the fuselage in the pressurized region, which approximately coincides with the passenger cabin, can be designed from longitudinally divided shell halves. In this case the frame element profile according to the invention on the side of the pressurized region needs to connect two shell halves, each of 180°, whereas the rear fuselage section usually forms a full ring of 360° at the connection position. To adapt to the two, according to another measure improving the invention, it is proposed that the frame element profile according to the invention be designed so as to be divided, wherein each frame element profile component forms a ring segment of up to 180°.

On the other hand, if the fuselage is to be designed as a so-called wound fuselage, at the connection position to the frame element profile according to the invention a continuous ring is provided, as is the case on the rear fuselage section. To adapt to the aforesaid it is proposed that the frame element profile be designed in a single part, thus forming a full ring of 360°.

As is generally aimed for in aircraft engineering, the frame element profile should be as lightweight as possible. In order to achieve this aim it is proposed that the frame element profile comprising the U-shaped profile section and the T-shaped profile section be manufactured as a milled part made from light metal. For example titanium or a titanium alloy can be used as a light metal so as to ensure sufficient material strength. Instead of using milling technology in the manufacture of the frame element profile it is also imaginable that casting technology be used. As a rule, at least partial machining is required following casting.

In order to form the static nodes between the frame element profile according to the invention and stringers that extend along the aforesaid, it is proposed that special stringer coupling components be used that are arranged on both sides of the frame element profile. The shape of the stringer coupling components matches the components that are to be interconnected in the region of the static node.

It is proposed that the layer design from the outside towards the inside be designed in such a manner by incorporating the above-mentioned components, that onto the outer shell of the adjacent fuselage section on the inside a gap sealing tape be applied, after which the T-shaped profile section of the frame element profile is applied in a gap-bridging manner, after which the end regions of the two stringer coupling components are applied inside or outside the pressurized region. Here again, attachment is preferably by means of rivets.

In order to carry out gap compensation it is advisable to use so-called shim material, which is known per se, which in conjunction with the frame element profile designed according to the invention can be placed particularly easily into the gap between the adjacent fuselage sections.

BRIEF DESCRIPTION OF THE DRAWINGS

Further measures improving the invention are shown in more detail below, together with the description of a preferred exemplary embodiment of the invention, with reference to the figures. The following are shown.

DETAILED DESCRIPTION OF EXEMPLARY EMBODIMENTS

Figure 1:
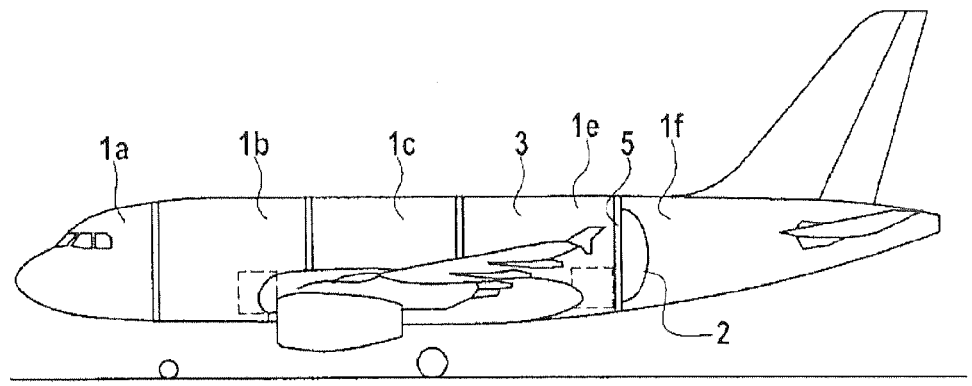
FIG. 1 a diagrammatic lateral view of an aircraft with a pressure fuselage that comprises several fuselage sections without shell division, FIG. 2 a diagrammatic lateral view of an aircraft with a pressure fuselage that comprises several fuselage sections with shell division, FIG. 3 a diagrammatic partial representation of the connection position between the dome-shaped pressure bulkhead and the adjoining fuselage section.

According to FIG. 1 the pressure fuselage of the aircraft, viewed in longitudinal direction, comprises several fuselage sections 1a-1e that at the border points are interconnected by way of closed oval ring cross sections in order to produce a long pressure fuselage. Between the fuselage section 1f, which forms the rear region, and the adjacent fuselage section 1e, by way of a special frame element profile 5, a rear dome-shaped pressure bulkhead 2 is attached that separates an aircraft-internal pressurized region 3 from a non-pressurized rear region that is associated with the fuselage section 1f. Within the aircraft-internal pressurized region 3 there is the passenger cabin as well as a cargo space arranged underneath the aforesaid.

Figure 2:
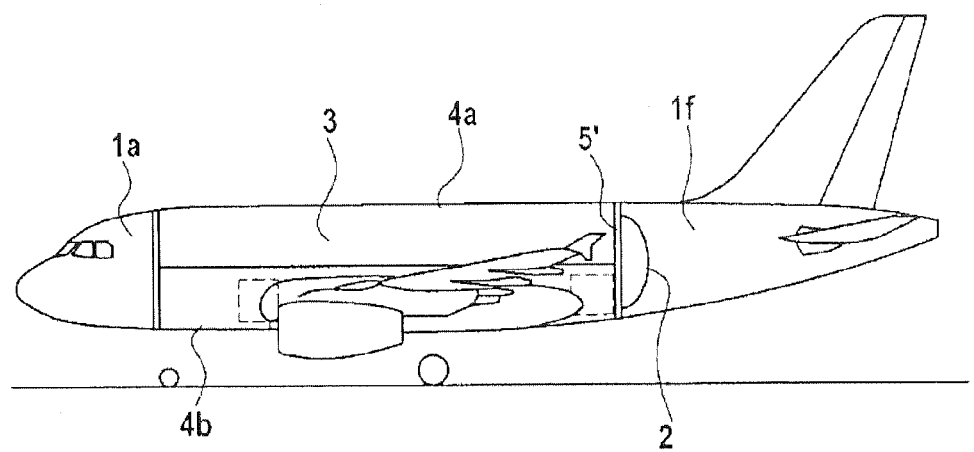

In contrast to the above, FIG. 2 diagrammatically shows a pressure fuselage designed according to the so-called shell division concept. Apart from the conventional fuselage section 1a which forms the front region, and the fuselage section 1f which forms the rear region, the outer shell of the pressure fuselage, which outer shell encloses the aircraft-internal pressurized region 3, is designed in two parts. To this extent this region comprises an upper half shell 4a and a lower half shell 4b. Both half shells 4a and 4b end at the rear at the dome-shaped pressure bulkhead 2 so that on the side of the aircraft-internal pressurized region 3 the two half shells 4a and 4b adjoin the frame element profile 5' that attaches the dome-shaped pressure bulkhead 2 to the pressure fuselage.

Figure 3:
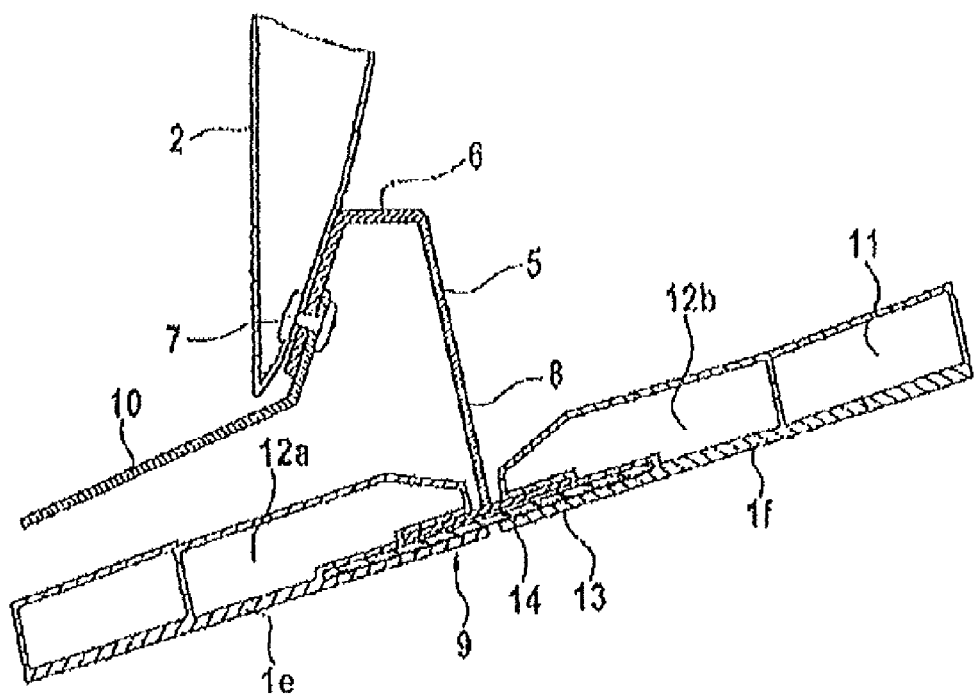

According to FIG. 3, the special frame element profile 5 on the side of the dome-shaped pressure bulkhead comprises a U-shaped profile section whose first end-side limb 6 is attached on the rear to the dome-shaped pressure bulkhead 2 by way of connecting means 7 designed as rivets. In contrast to this, the elongated radially-outwards extending second limb 8 of the U-shaped profile section establishes a connection to the two fuselage sections 1e and 1f. To this effect the elongated radially-outwards extending second limb 8 of the frame element profile 5 leads to a T-shaped profile section. Its cross piece 9 is provided for bridging attachment of the adjacent fuselage sections 1e and 1f, namely also by rivets (not shown in further details in the illustration).

To achieve adequate stability of the connection position formed by the frame element profile 5, to complement the aforesaid, several tension struts 10 are provided that are arranged so as to be spaced apart from each other along the circumference of the dome-shaped pressure bulkhead 5. Likewise, one end of the individual tension struts 10 is attached to the dome-shaped pressure bulkhead 2 by way of the connecting means 7, and analogously the other end is also attached to the associated fuselage section 1e on the pressurized side.

Longitudinally extending stringers 11 form a static node by way of stringer coupling components 12a and 12b arranged on both sides of the frame element profile 5.

The layer design in the region of the node results from the outside towards the inside in such a manner that on the outer shell 13 of the adjacent fuselage sections 1e and 1f on the inside a gap sealing tape 14 is applied, after which the cross piece 9 of the T-shaped profile section of the frame element profile 5 is applied in a gap-bridging manner. In this position the two stringer coupling components 12a and 12b are supported in the manner of clamping jaws. All the above-mentioned components are rigidly interconnected by rivets (not shown).

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Fuselage section
2 Dome-shaped pressure bulkhead
3 Pressurized region
4 Shell half
5 Frame element profile
6 First limb
7 Connecting means
8 Second limb
9 Cross piece
10 Tension strut
11 Stringer
12 Stringer coupling component
13 Outer shell
14 Gap sealing tape

The invention claimed is:

1. A pressure fuselage of an aircraft, comprising:
a forward fuselage section and a rear fuselage section, said fuselage sections arranged along a longitudinal direction of the fuselage,
a rear dome-shaped pressure bulkhead for forming an internally pressurized region in the aircraft forward of the dome-shaped pressure bulkhead, and
a ring-shaped frame for attachment of the outer circumference of said dome-shaped pressure bulkhead to at least one of the fuselage sections;
wherein the ring-shaped frame has a cross-section comprising a first limb, a second limb, a base, and a cross-piece;
wherein said first limb extends in a primarily radial direction relative to the center of the ring-shaped frame from a proximal end to a distal end;
wherein said second limb extends in a primarily radial direction relative to the center of the ring-shaped frame from a proximal end to a distal end, wherein the distal end of the second limb is farther from the center of the ring-shaped element than the distal end of the first limb;
wherein said base extends in a primarily longitudinal direction relative to the fuselage, and extends from the proximal end of the first limb to the proximal end of the second limb;
wherein the cross-piece extends in a longitudinal direction relative to the fuselage from a forward end to a rear end, and is connected to the distal end of the second limb at a location between said forward end and aft end;
wherein the first limb is configured to be attached to the dome-shaped pressure bulkhead by at least one fastener, in such a manner that it is possible for the at least one fastener to be installed solely from the internally pressurized region of the aircraft; and wherein at least one of said fuselage sections is attached to the cross-piece of the ring-shaped frame.

2. The pressure fuselage of claim 1, further comprising a plurality of tension struts arranged so as to be spaced apart from each other along the circumference of the dome-shaped pressure bulkhead, which tension struts by first ends thereof are attached to the dome-shaped pressure bulkhead and to the ring-shaped frame by way of the at least one fastener.

3. The pressure fuselage of claim 2, wherein each of the plurality of tension struts is configured as a metal strip of adequate tensile strength, said metal strip comprising on first end regions thereof at least one opening for receiving the at least one fastener.

4. The pressure fuselage of claim 1, wherein the cross-piece of the ring-shaped frame interconnects the fuselage sections.

5. The pressure fuselage of claim 1, further comprising rivets for attachment of the at least one fuselage section to the cross-piece of the ring-shaped frame.

6. The pressure fuselage of claim 1, wherein the fuselage in a pressurized region comprises longitudinally divided first and second shell halves.

7. The pressure fuselage of claim 6, wherein the ring-shaped frame is configured in first and second parts, wherein each frame part forms a ring segment of 180°.

8. The pressure fuselage of claim 1, wherein the ring-shaped frame is configured as a single part, thus forming a full ring of 360°.

9. The pressure fuselage of claim 1, wherein the ring-shaped frame comprises a milled part made from light metal.

10. The pressure fuselage of claim 1, further comprising a plurality of longitudinally extending stringers forming a static node by way of first and second stringer coupling components arranged on forward and rear sides of the ring-shaped frame, respectively.

11. The pressure fuselage of claim 10, further comprising a gap sealing tape applied on the inside on the outer shell of the adjacent fuselage section, wherein the cross-piece of the ring-shaped frame is applied in a gap-bridging manner, and wherein the end regions of the first and second stringer coupling components are applied inside and outside the pressurized region, respectively.

* * * * *